(12) United States Patent
Hoff

(10) Patent No.: US 11,851,868 B2
(45) Date of Patent: Dec. 26, 2023

(54) ADJUSTABLY SIZED SKIMMER AND ASSOCIATED SYSTEM FOR USE IN MANHOLES

(71) Applicant: Momentum Environmental, LLC, Willmar, MN (US)

(72) Inventor: Lance Hoff, Willmar, MN (US)

(73) Assignee: Momentum Environmental, LLC, Willmar, MN (US)

( * ) Notice: Subject to any disclaimer, the term of this patent is extended or adjusted under 35 U.S.C. 154(b) by 0 days.

(21) Appl. No.: 17/327,354

(22) Filed: May 21, 2021

(65) Prior Publication Data

US 2022/0372745 A1    Nov. 24, 2022

(51) Int. Cl.
*E03F 5/14* (2006.01)
*E03F 5/02* (2006.01)
*B01D 21/00* (2006.01)

(52) U.S. Cl.
CPC .............. *E03F 5/14* (2013.01); *B01D 21/003* (2013.01); *E03F 5/02* (2013.01)

(58) Field of Classification Search
CPC ........ E03F 5/02; E03F 5/0403; E03F 5/0404; E03F 5/14; B01D 17/0211; B01D 21/0003; B01D 21/003; B01D 21/0033
USPC .. 210/170.03, 521, 532.1, 538, 747.2, 747.3
See application file for complete search history.

(56) References Cited

U.S. PATENT DOCUMENTS

| | | |
|---|---|---|
| 1,793,599 A | 2/1931 | Gan |
| 2,216,300 A | 10/1940 | Shenk |
| 4,132,652 A | 1/1979 | Anderson et al. |
| 4,157,969 A | 6/1979 | Thies |
| 4,543,114 A | 9/1985 | Beattie et al. |
| 4,689,145 A | 8/1987 | Mathews et al. |
| 5,204,000 A | 4/1993 | Steadman et al. |
| 5,405,539 A * | 4/1995 | Schneider ............. E03F 5/0404 210/170.03 |
| 5,643,445 A * | 7/1997 | Billias ....................... E03F 5/14 210/163 |

(Continued)

FOREIGN PATENT DOCUMENTS

| | | | | |
|---|---|---|---|---|
| CN | 112726790 A * | 4/2021 | ............ | E03F 5/0404 |
| DE | 3305344 A1 | 9/1984 | | |

OTHER PUBLICATIONS

English Translation of Yu Patent Publication CN 112726790A, published Apr. 2021. (Year: 2021).*

(Continued)

*Primary Examiner* — Joseph W Drodge
(74) *Attorney, Agent, or Firm* — JoAnn M. Seaton; Griffiths & Seaton PLLC

(57) ABSTRACT

A skimmer for use in a manhole includes a frame and cladding. The frame includes an adjustable arc having an adjustable overall length and including an arced member, a first side member and a second side member. The arced member has a first end and a second end opposite the first end and defining a curve therebetween. The first side member is slidably adjustable relative to a first end of the arced member and selectively coupled thereto in one of a plurality of predefined first side member positions. The second side member is slidably adjustable relative to a second end of the arced member and selectively couplable thereto in one of a plurality of predefined second side member positions. The cladding covers a substantially entirety of one side of the frame.

20 Claims, 15 Drawing Sheets

(56) References Cited

U.S. PATENT DOCUMENTS

| | | | |
|---|---|---|---|
| 6,022,474 A | 2/2000 | MacKelvie | |
| 6,086,758 A * | 7/2000 | Schilling | E03F 5/0404 |
| | | | 210/164 |
| 6,126,817 A | 10/2000 | Duran et al. | |
| 6,149,803 A * | 11/2000 | DiLoreto, Jr. | B01D 29/96 |
| | | | 210/170.03 |
| 6,524,473 B2 | 2/2003 | Williamson | |
| 6,811,708 B2 * | 11/2004 | Shaw | E03F 5/0404 |
| | | | 210/747.3 |
| 6,955,756 B2 | 10/2005 | Fallon | |
| 7,005,060 B2 | 2/2006 | Pitt et al. | |
| 7,011,743 B2 | 3/2006 | Use et al. | |
| 7,033,496 B2 | 4/2006 | Thacker et al. | |
| 7,282,143 B2 | 10/2007 | Liao | |
| 7,332,091 B2 | 2/2008 | Peters, Jr. et al. | |
| 7,488,414 B2 | 2/2009 | Wimberger | |
| 7,494,585 B2 | 2/2009 | Nino | |
| 7,497,234 B2 | 3/2009 | Robinson | |
| 7,534,355 B2 | 5/2009 | Lockerman et al. | |
| 7,544,303 B2 | 6/2009 | Frink | |
| 3,017,004 A1 | 9/2011 | Crumpler | |
| 8,034,236 B1 | 10/2011 | Happel | |
| 8,162,562 B2 | 4/2012 | Sansalone | |
| 8,287,726 B2 | 10/2012 | Williams et al. | |
| 8,343,357 B2 | 1/2013 | Horner | |
| 8,663,466 B2 | 3/2014 | Braunwarth et al. | |
| 8,715,507 B2 | 5/2014 | Gulliver et al. | |
| 9,562,350 B1 | 2/2017 | Witt | |
| 9,752,600 B2 | 9/2017 | Hoff et al. | |
| 10,238,993 B1 | 3/2019 | Happel | |
| 10,344,466 B2 | 7/2019 | Kent | |
| 10,626,592 B2 | 4/2020 | Dubois et al. | |
| 10,655,318 B2 | 5/2020 | Paivinen | |
| 10,815,131 B2 | 10/2020 | Sparke | |
| 10,907,338 B1 * | 2/2021 | Happel | E03F 5/0403 |
| 2008/0035570 A1 | 2/2008 | Lugo | |
| 2008/0283475 A1 | 11/2008 | Benty et al. | |
| 2012/0222995 A1 * | 9/2012 | Sasaki | E03F 5/14 |
| | | | 210/170.03 |
| 2014/0064840 A1 * | 3/2014 | McInnis | E03F 5/0404 |
| | | | 403/374.3 |
| 2015/0259896 A1 * | 9/2015 | Jarvis | E03F 5/14 |
| | | | 210/131 |
| 2015/0345523 A1 * | 12/2015 | Hoff | E03F 5/0403 |
| | | | 210/170.03 |
| 2018/0304177 A1 * | 10/2018 | Kent | E03F 5/0404 |
| 2019/0264717 A1 * | 8/2019 | Chamberlain | E03F 5/0403 |

OTHER PUBLICATIONS

"Snout Installation Sequence", printed from www.bmpinc.com, publicly available at least as early as Dec. 3, 2020 (1 page).

"Upstream Technologies", printed from www.upstreamtechnologies.us/, publicly available at least as early as Jun. 20, 2013, per http://web.archive.org (4 pages).

"45 Minute Stormwater Sediment Solution", printed from http://upstreamtechnologies.us/wp-content/uploads/2015/05/SAFL-Baffle-Data-Sheet-Web-Quality-5-9-15-Revision-USA.pdf, publicly available at least as early as May 15, 2015 (2 pages).

* cited by examiner

ADJUSTABLY SIZED SKIMMER AND ASSOCIATED SYSTEM FOR USE IN MANHOLES

BACKGROUND OF THE INVENTION

Sumped manholes are commonly used in sewer systems to temporarily collect settleable solids until they can be removed from the system during routine maintenance. As illustrated in FIGS. 1 and 2, a typical sumped manhole 12 includes a cylindrical manhole sidewall 14 and a bottom 16. In one example, an inlet pipe 18 extends into manhole sidewall 14 via an inlet hole 20 in manhole sidewall 14, and an outlet pipe 22 extends into manhole sidewall 14 via an outlet hole 24 in manhole sidewall 14. A top inlet in the form of a pipe or drain inlet 28 may extend from the top of and into sumped manhole 12. Both inlet pipe 18, inlet drain 28, and outlet pipe 22 are spaced above bottom 16 of sumped manhole 12 to form a sump 26 below inlet and outlet pipes 18 and 22 above bottom 16 of sumped manhole 12.

In a drain system 10 including a typical sumped manhole 12, fluids flow into sumped manhole 12 via inlet pipe 18 and/or inlet drain 28 and out of sumped manhole 12 via outlet pipe 22, as generally indicated with arrows in FIG. 2. The fluids moving from inlet pipe 18 to outlet pipe 22 carry solids, such as sediment and larger waste items, and drop at least a portion of the solids carried therewith into sump 26. Due to the assumed marginal removal efficiencies of standard sumped manholes 12, several products have been developed that claim to greatly improve the performance of sumped manholes 12 via the addition of internal components to sumped manhole 12. These products focus on designs that claim to increase removal efficiencies, reduce scour, or both.

One such product is a floatables skimmer 40 as illustrated, for example, in FIGS. 3 and 4 as added to sumped manhole 12 as originally presented in FIGS. 1 and 2. Skimmer 40 is formed of a substantially solid material restricting fluid flow 42 therethrough and is coupled to manhole sidewall 14 on either side of outlet pipe 22. In this manner, skimmer 40 extends both above and below a top and a bottom of outlet pipe 22, respectively. Skimmer 40 serves to decrease floating larger solids 44 and smaller solids alike from rushing with the fluid flow 28 into outlet pipe 22. Difficulties arise in properly fitting and securing skimmers within the sumped manhole.

SUMMARY OF THE INVENTION

One aspect of the present invention relates to a skimmer for use in a manhole and including a frame and cladding. The frame defines an upstream side and a downstream side and includes an adjustable arc having an adjustable overall length. The frame includes an arced member, a first side member and a second side member. The arced member has a first end and a second end opposite the first end and defining a curve between the first end and the second end. The first side member is slidably adjustable relative to a first end of the arced member and selectively coupled with a first end of the arced member in one of a plurality of predefined first side member positions. The second side member is slidably adjustable relative to a second end of the arced member and selectively couplable with the first end of the arced member in one of a plurality of predefined second side member positions. The cladding covers a substantially entirety of an upstream side of the frame and is substantially impervious to water. Other apparatus, assemblies, systems and associated methods are also disclosed.

BRIEF DESCRIPTION OF THE DRAWINGS

Embodiments of the invention will be described with respect to the figures, in which like reference numerals denote like elements, and in which.

DETAILED DESCRIPTION

In view of issues identified with prior art sumped manhole systems, the current invention provides settleable solids management and drainage system and methods including a skimmer to increase removal of solids in sumped flow-through manholes. In one embodiment, the system according to one embodiment of the current invention includes a skimmer with frame and cladding members configured for installation on opposing sides of an outlet pipe. The frame allows for in-place adjustment during installation to account for a range of sizes of sump pipes and/or imperfections or unexpected impedances or obstructions encountered on the sides of the sumped manhole. The adjustability of the skimmer frame helps decrease delays during installation and decreases the assortment of skimmer sizes needed to service the broad range of sizes of sumped manholes. In addition, the nature of the frame being assemblable in the sumped manhole and cladded therein allows for easy transport of skimmer components to and from the sumped manhole worksite.

Figure 1:
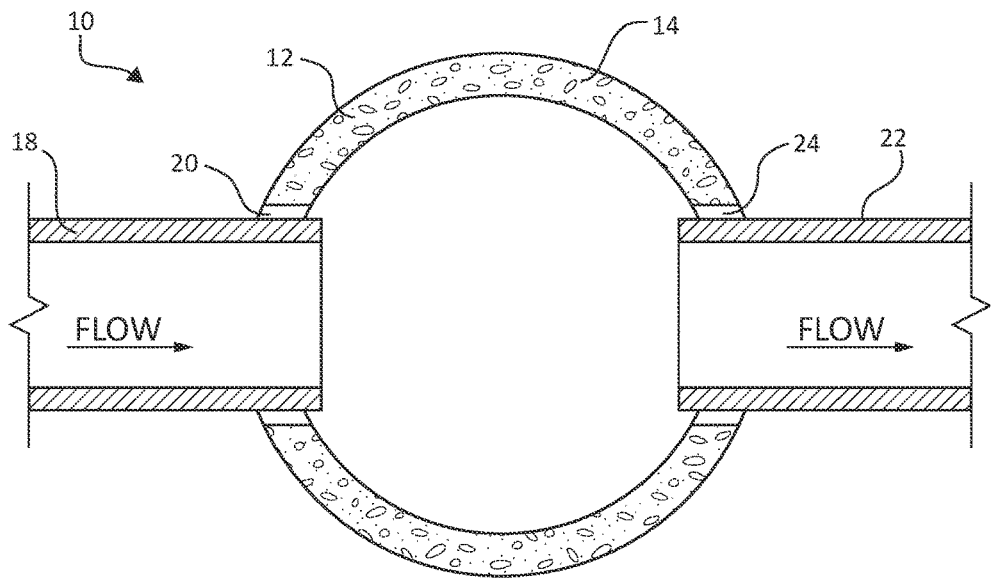
FIG. 1 is top view of a drain system of the prior art with a portion of the included sumped manhole removed for illustrative purposes.
Figure 2:
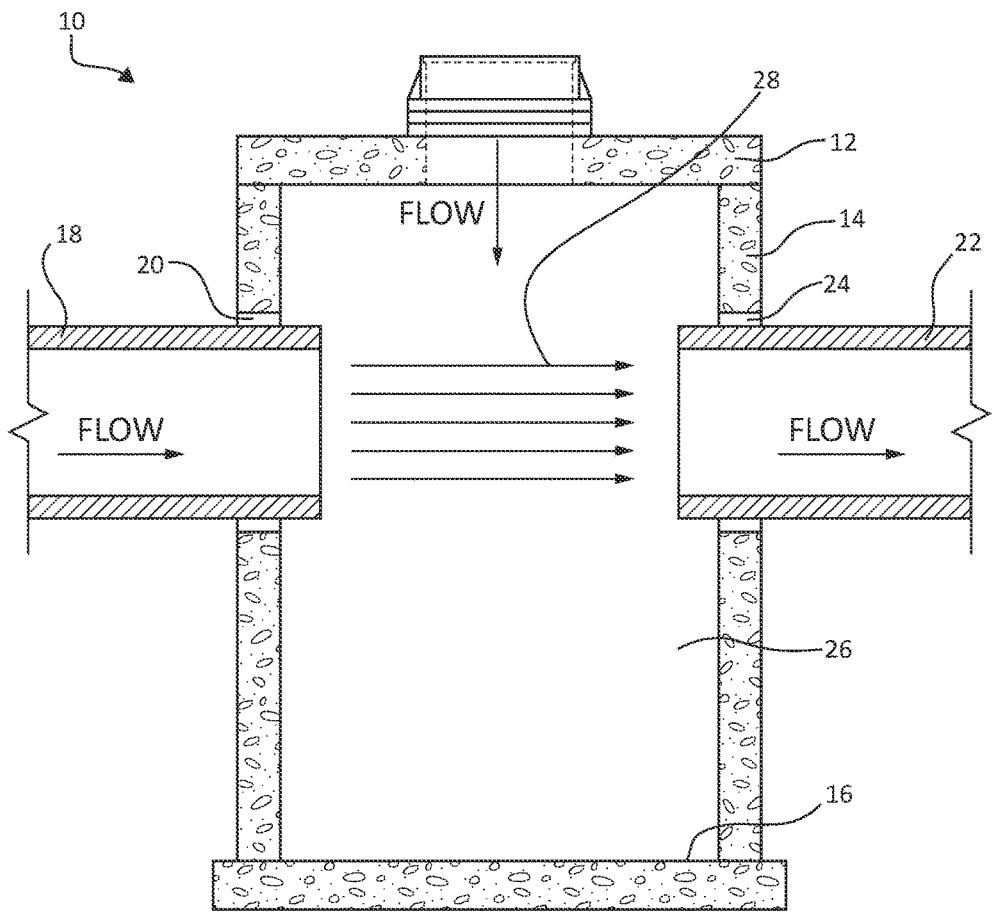
FIG. 2 is a side view of the prior art drain system of FIG. 1 with a portion of an included manhole sidewall removed for illustrative purposes.
Figure 3:
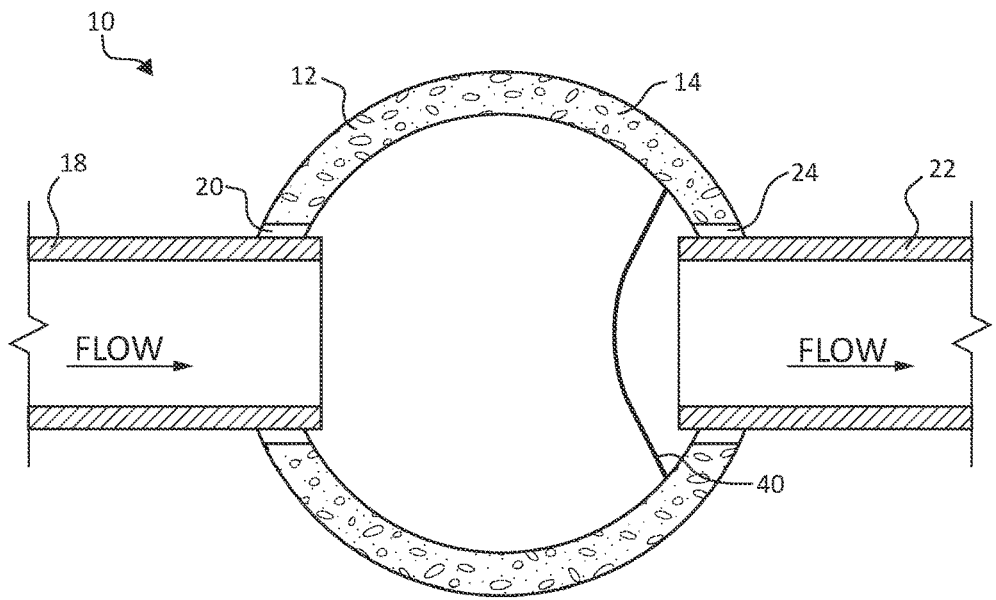
FIG. 3 is top cross-sectional view of a prior art drain system including a floatables skimmer installed therein.
Figure 4:
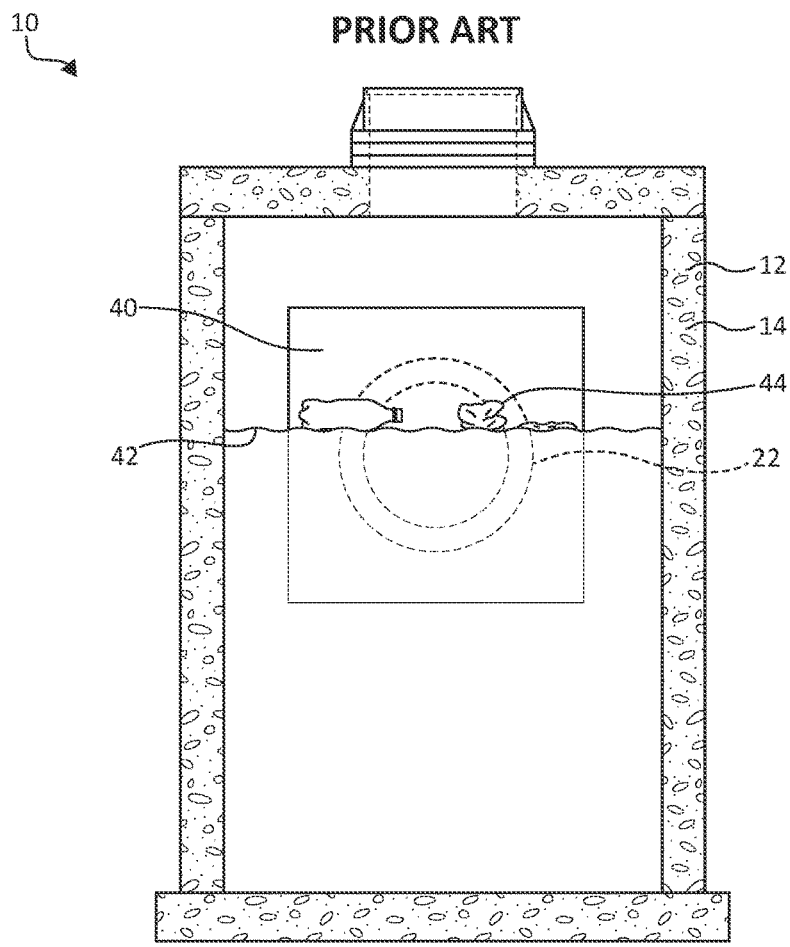
FIG. 4 is a side view of the prior art drain system of FIG. 3 with a portion of the manhole sidewall removed for illustrative purposes.
Figure 5:
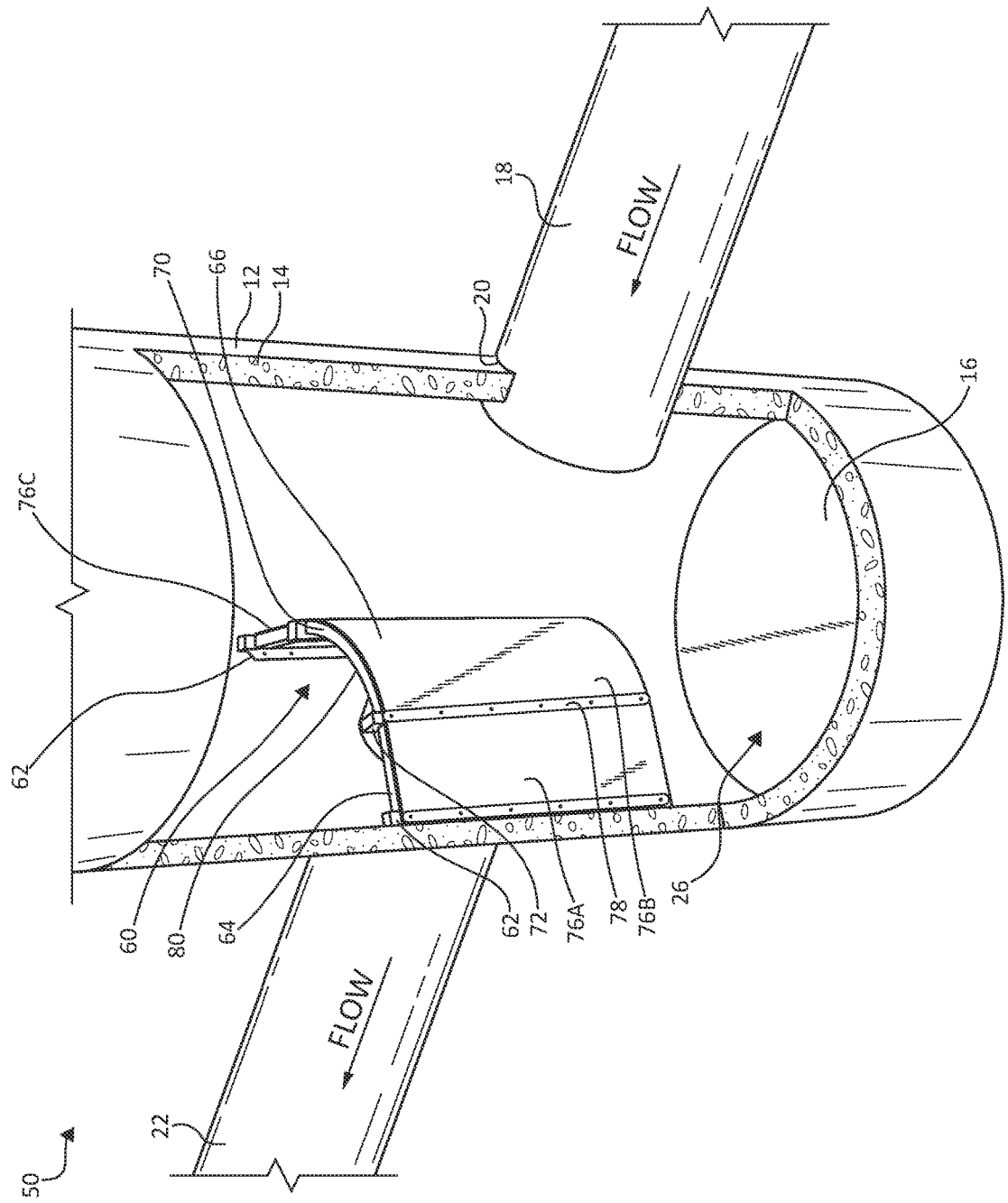
FIG. 5 is a perspective view illustration of a drain system with a portion of an included sumped manhole removed for illustrative purposes, according to one embodiment of the present invention.
Figure 6:
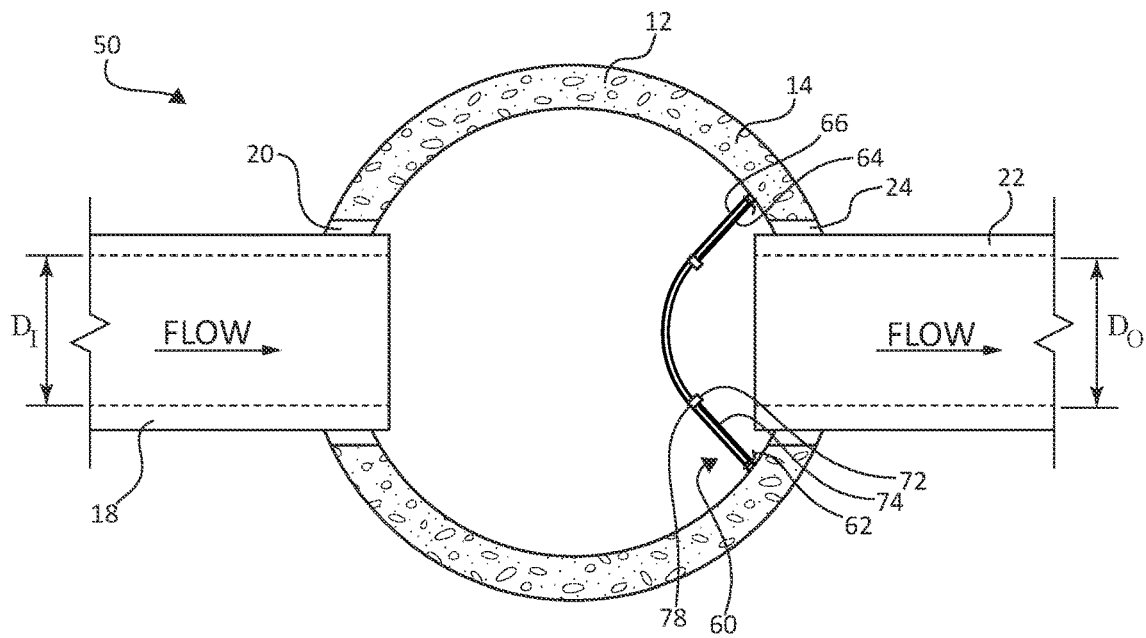
FIG. 6 is a top view of the drain system of FIG. 5 with a portion of the sumped manhole removed for illustrated purposes, according to one embodiment of the present invention.
Figure 7:
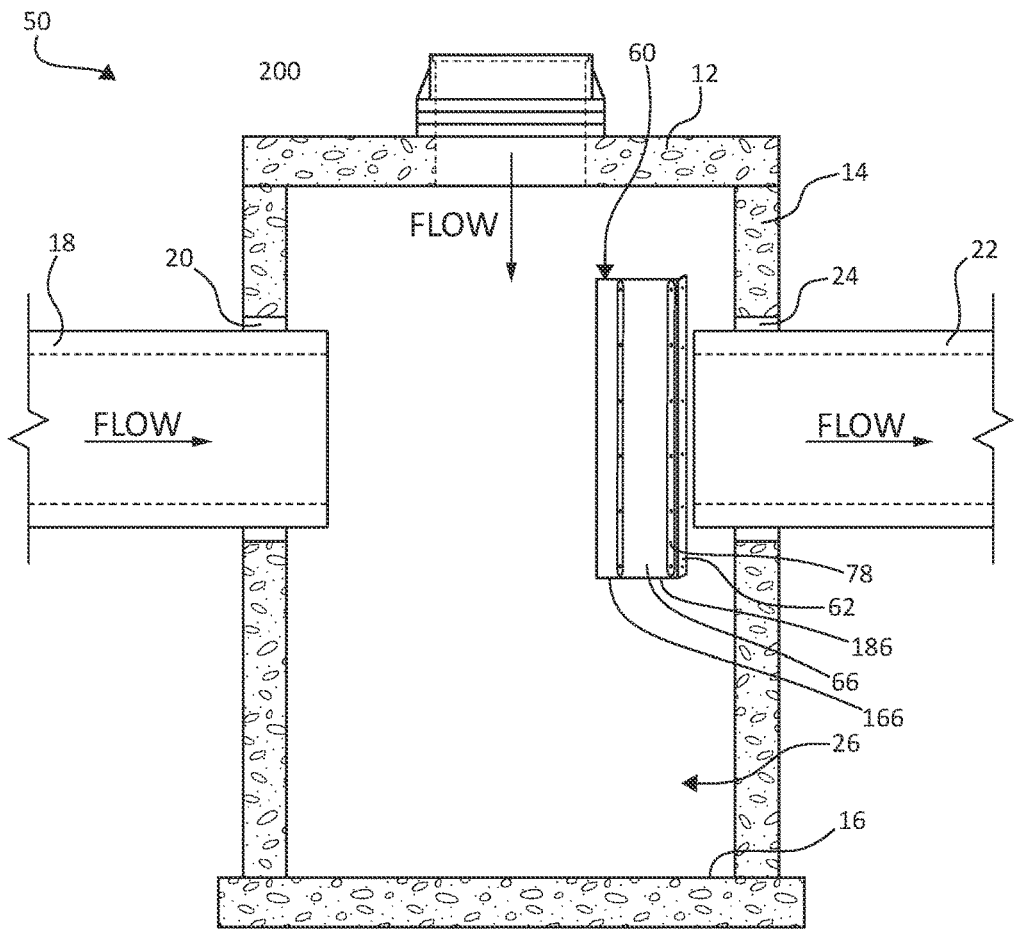
FIG. 7 is a right view of the drain system of FIG. 6 with a portion of the sumped manhole removed for illustrated purposes, according to one embodiment of the present invention.

For example, FIGS. 5-7 collectively illustrate one embodiment of a drain system 50 in accordance with the present invention. Drain system 50 includes a sumped flow through sumped manhole 12, at least one inlet pipe 18 and/or inlet drain 28, and outlet pipe 22, and a skimmer 60. As described above with respect to the prior art, in one example, inlet pipe 18 extends through an inlet hole 20 in manhole sidewall 14, inlet drain 28 extend into a top of sumped manhole 12, and outlet pipe 22 extends partially into manhole sidewall 14 through outlet hole 24 in manhole sidewall 14. As illustrated in the embodiment of FIGS. 5-7, inlet hole 20 and outlet hole 24 are positioned diametrically opposed to one another, that is, at about 180° relative to each other about a circumference of sumped flow-through sumped manhole 12. Other positionings and orientations of outlet pipe 22 relative to inlet pipe 18 are also contemplated for use with this innovation. In one example, inlet drain 28 is configured to allow fluid to flow down into sumped manhole 12 from surface water collection, ground water collection, and/or other piped fluid flow. Sumped manhole 12, inlet pipe 18, and outlet pipe 22 may each have any one of a number of diameters as generally selected to accommodate expected fluid flow in the corresponding portion of drain system 50. In one embodiment, at least sumped flow-through sumped manhole 12 is formed from concrete or another suitable material.

Each of inlet hole 20 and outlet hole 24 are positioned above a bottom 16 of sumped flow-through sumped manhole 12 in a manner creating a sump 26 therebelow. In one example, each of inlet pipe 18 and outlet pipe 22 is positioned a distance from a bottom of the catch basis that is equal to or greater than about one and a half times a smallest inside diameter $D_I$ or $D_O$ of the inlet pipe 18 and the outlet pipe 22, respectively. The respective inside diameters $D_I$ or $D_O$ of inlet pipe 18 and outlet pipe 22 are sized based on where sumped flow-through sumped manhole 12 will be used and associated characteristics thereof, such as expected average and peak flow-rates. Other sized inlet pipes 18 and outlet pipes 20 sized in other proportions as compared to each other and/or the size of sumped manhole 12 are also contemplated.

In one embodiment, skimmer 60 is configured for installation in an arcuate manner relative to outlet pipe 22 as illustrated in FIGS. 5-7 via use of mounting brackets 62 coupled to each of skimmer 60 and sidewall 14 of manhole 12. Skimmer 60 includes a frame 64 and cladding sheets 66 coupled thereto. More particularly, frame 64 is formed in an adjustable manner allowing skimmer 60 to be used in manholes 12 of differing sizes and to adjust to any obstructions or imperfections in sidewall 14 that may otherwise hamper installation of skimmer 60.

Figure 8:
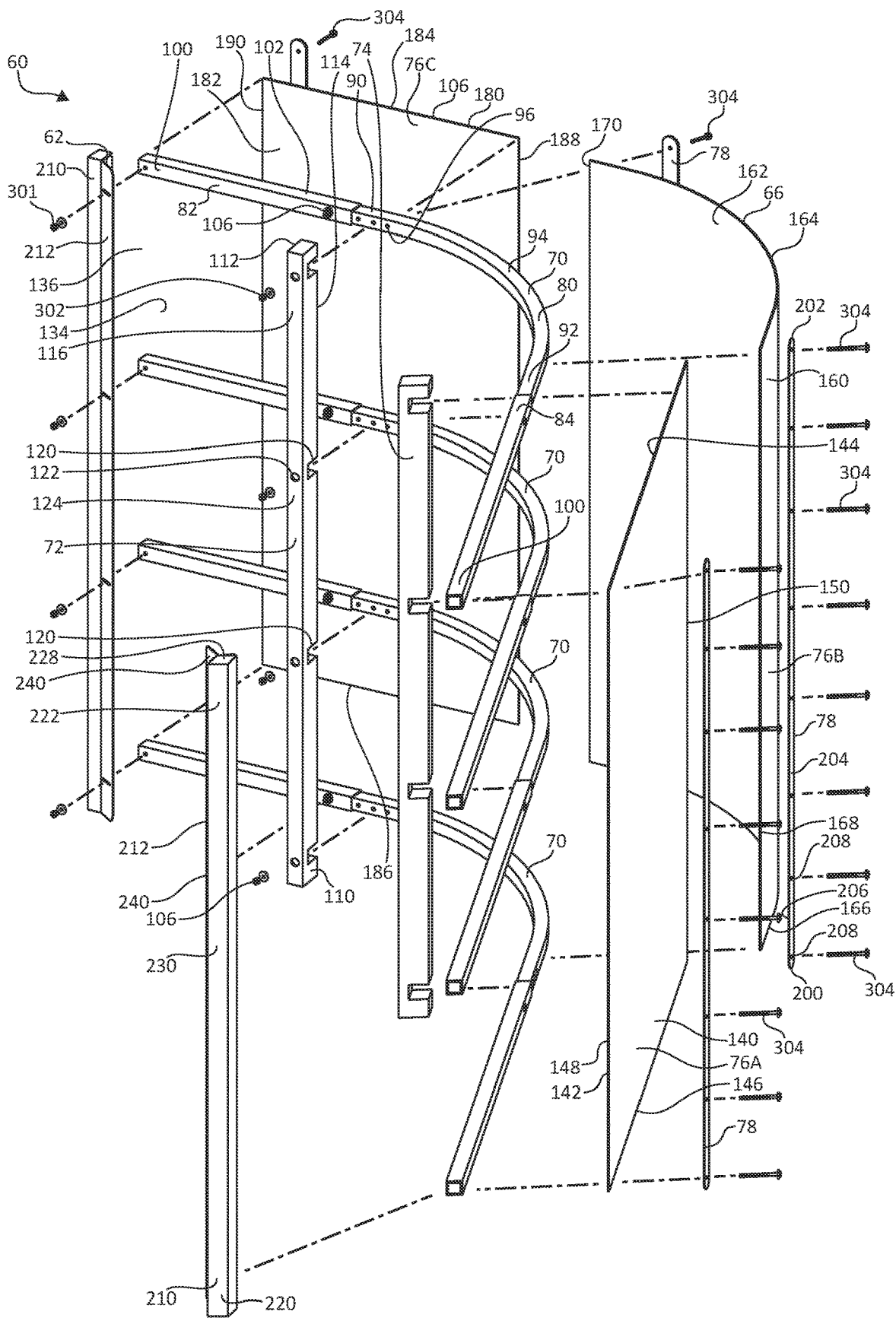
FIG. 8 is an exploded, perspective view illustration of a skimmer of the drain system of FIG. 5, according to one embodiment of the present invention

Once embodiment of skimmer 60 is more specifically illustrated with reference to FIGS. 8-13. FIG. 8 illustrates an exploded, perspective view of skimmer 60, according to one embodiment of the present invention. As illustrated in FIG. 8, frame 64 includes adjustable arcs 70, vertical supports 72, cladding sheets 66, and fastening strips 78. Adjustable arcs 70 define the overall size and shape of skimmer, with the position of each adjustable arc 70 being maintained by mounting brackets 62, and/or strength being bolstered by vertical supports 72. Cladding sheets 76, such as three cladding sheets 76A, 76B, and 76C, cover at least one side of the resultant frame in a manner configured to block direct flow to outlet pipe 22 and to collect floatable debris that may have entered manhole 12 through inlet pipe 18 and/or inlet drain 28 or in any other manner.

Figure 9:
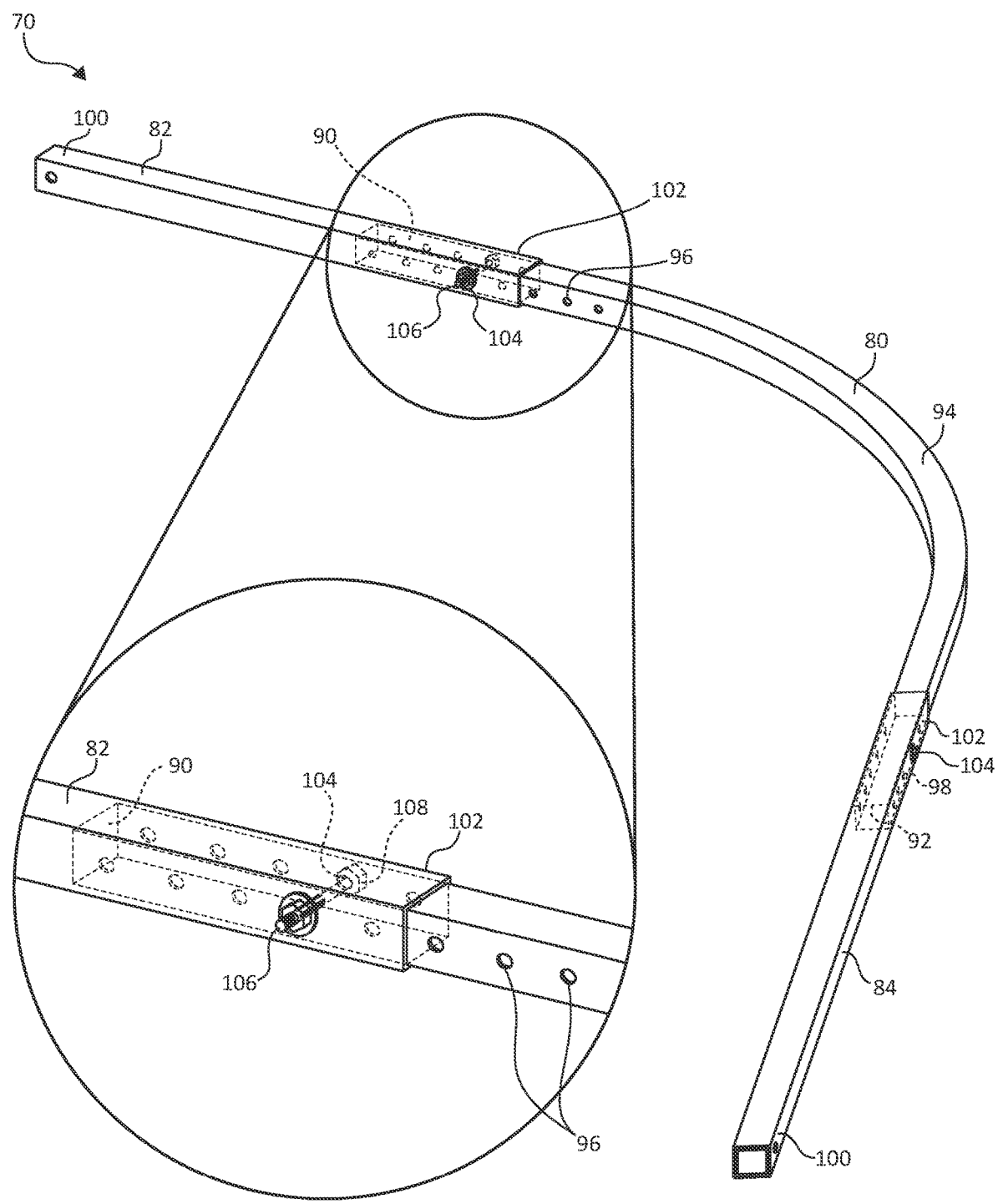
FIG. 9 is a perspective view of an adjustable arc of the skimmer of FIG. 8, according to on embodiment of the present invention.

FIG. 9 illustrates one example of an adjustable arc 70 in additional detail. For example, adjustable arc 70 includes an arced member 80, a first side or linear member 82, and a second side or linear member 84. First arced member 80, in one embodiment is a tubular member extending from a first end 90 to an opposite, second end 92. In one example, each of first end 90 and second end 92 are substantially linear. First arced member 80 further includes an arc segment 94 extending between first end 90 and second end 92, such that first end 90 extends at an angle relative to second end 92 between about 0 degrees and about 180 degrees, for example, between about 80 degrees and 100 degrees. In the illustrated embodiment, arced member 80 has a rectangular, e.g., square, cross-section and is formed of a suitable substantially rigid material such as aluminum or steel. Arced member 80 additionally includes a linear array of apertures 96, for example, substantially equally spaced apertures 96, extending from near first end 90 opposite arc segment 94 inwardly toward arc segment 94. Similarly, arced member 80 additionally includes a linear array of apertures 98, for example, substantially equally spaced apertures 98, extending from near second end 2 opposite arc segment 94 inwardly toward arc segment 94.

First linear member 82 and second linear member 84 are similarly formed to extend from a first end 100 to a second end 102 as a tubular member having an interior cross-sectional shape substantially identical to, but slightly larger than an exterior cross-sectional shape of arced member 80. In the illustrated embodiment, each of first linear member 82 and second linear member 84 have a rectangular, e.g., square, cross-section and is formed of a suitable substantially rigid material such as aluminum or steel. Each of first linear member 82 and second linear member 84 additionally including at least one aperture pair 104 near its respective second end 102, where each aperture in the aperture pair 104 is axially aligned with each other on opposite sides of the tubular member forming the respective one of first linear member 82 and second linear member 84.

Adjustable arc 70 is assembled by sliding second end 102 of first linear member 82 over first end 90 of arced member 80 in a telescoping manner. First linear member 80 is slid to any position that aligns aperture 104 with one of the linear array of apertures 96 and is secured in the desired position via a pin member 106, such as a bolt, screw, tension pin, etc., extending through both of arced member 80 and first linear member 82, which may be capped or secured on a back side thereof via a nut 108 or other suitable mechanism.

Similarly, second end 102 of second linear member 84 is slid over second end 92 of arced member 80 in a telescoping manner. Second linear member 84 is slid to any position that aligns its aperture 104 with one of the linear array of apertures 98 and is secured in the desired position via another pin member 106 extending through both of first linear member 80 and first linear member 82, which may be capped or secured on a back side thereof via another nut 108 or other suitable mechanism. When assembled, in one embodiment, first linear member 82 extends at an angle relative to second linear member 84 between about 0 degrees and about 180 degrees, for example, between about 80 degrees and 100 degrees.

Figure 10:
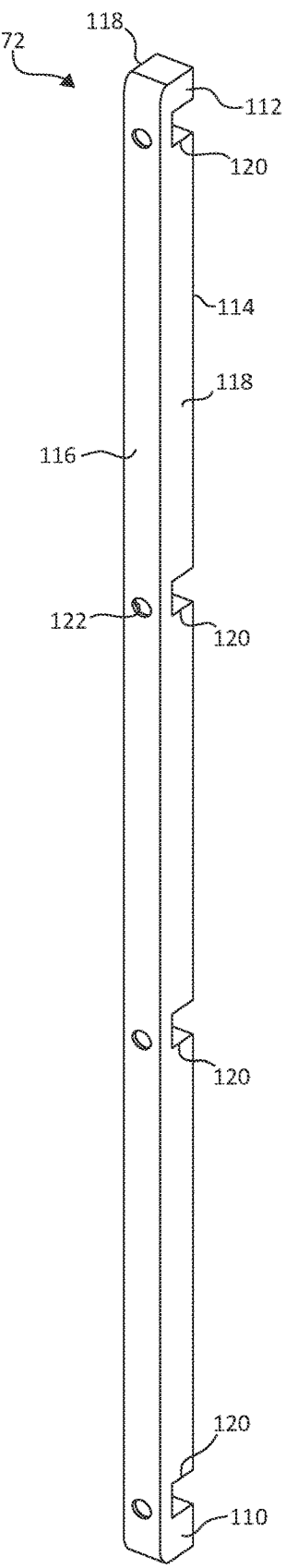
FIG. 10 is a perspective view of a vertical support of the skimmer of FIG. 8, according to on embodiment of the present invention.
Figure 11:
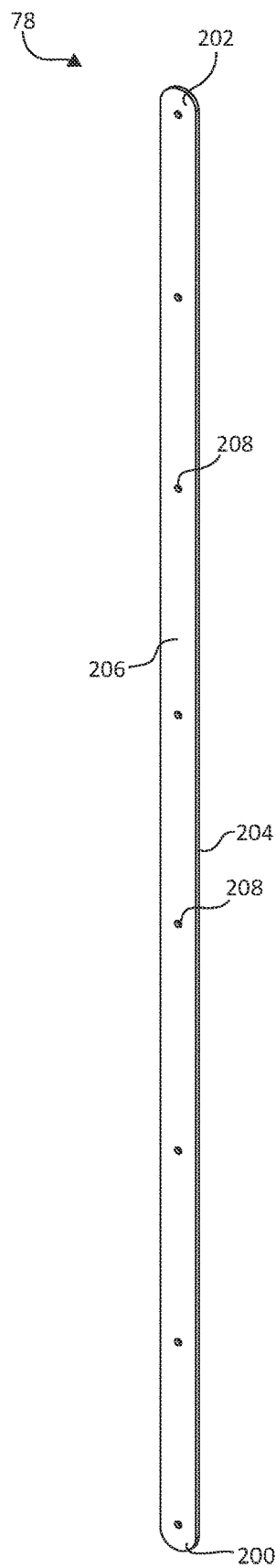
FIG. 11 is a perspective view of a fastening strip of the skimmer of FIG. 8, according to on embodiment of the present invention.

FIG. 10 illustrates one example of vertical support 72 used to support and provide rigidity to skimmer 60, which extends in an elongated and substantially planar manner between a first end 110 and a second end 112. Vertical support 72 is formed of a solid or tubular rectangular member, for example, formed of rigid metal, such as aluminum of steel, defining a front surface 114, a rear surface 116 opposite front surface 114, side surfaces 118 each extending between front surface 114 and back surface 116 opposite one another. Each of front surface 114 and side surfaces 118 are substantially planar, in one example, with rear surface 116 being either substantially planar and/or formed by two longitudinal edges adjacent each of opposing side surfaces 118. Vertical support 72 further defines notches 120 where notch 120 extends through and from rear surface 116 into an opposing one of side surfaces 118 toward front surface 114. Each notch 120 maybe be formed by two spaced apart notches in cases where vertical support 72 is hollow or non-solid therebetween. Each notch 120 has a substantially identical shape, for example, a shape substantially identical to a shape of one or both of first linear member 82 and second linear member 84 of adjustable arc 70. Each notch of pair of notices 120 is longitudinally aligned with each other between first end 110 and second end 112 of vertical support 72. In this manner, pair of notches 120 is configured to each receive one of first linear member 82 and second linear member 84 as will be further described below. In one embodiment, each vertical support 72 includes a plurality of pairs of notches 120 linearly spaced along vertical support 72 between first end 110 and second end 112.

In one embodiment, front surface 114 of vertical support 72 additionally includes a plurality of first apertures 122 and a second plurality of second apertures 124. Each of the plurality of larger apertures 122 is longitudinally aligned with a center of each pair of notches 120 in one example. In one example, ones of the plurality of second apertures 124 are positioned spaced between adjacent ones of the plurality of first apertures 122, and others of the second apertures 124 are placed to more closely flank each of the plurality of first apertures 122.

In one embodiment, cladding sheets 66 are configured to fill in between openings in frame 54 to block fluid flow along an overall curvature or shape of frame 54. Each of cladding sheets 66 is formed of one of solid, liquid impervious sheeting, perforated sheeting, and screened sheeting, according to one example. In one embodiment, cladding sheets 66 includes a first cladding sheet 76A, a second cladding sheet 76B, and a third cladding sheet 76C, each being of substantially rectangular shape, sufficiently flexible to allow some curvature thereof, and sized to fit a particular part of frame 54. In one example, each of cladding sheets 66 is sufficiently flexible to curve around and abut front surfaces of frame 54 and may be liquid impervious, solid sheeting, perforated sheeting, screen sheeting and/or otherwise formed and/or other suitable material. In one embodiment, cladding sheets 66 are formed of any suitable sheeting material such as a resin or plastic, e.g., high density polyethylene (HDPE), thin aluminum, thin steel, fabric, or similar. As illustrated in FIGS. 5-8 and 13-16, cladding sheets 66 are each solid sheet of HDPE material.

For example, first cladding sheet 76A defines a front or upstream surface 140, a rear or downstream surface 142 opposite to and facing in an opposite direction than upstream surface 140, a top edge 144, a bottom edge 146 opposite top edge 144, a first side edge 148, and a second side edge 150. Each of first side edge 148 and second side edge 150 extends from top edge 144 to bottom edge 146 opposite one another.

In one embodiment, second cladding sheet 76B defines a front or upstream surface 160, a rear or downstream surface 162 opposite to and facing in an opposite direction than upstream surface 160, top edge 164, bottom edge 166 opposite top edge 164, a first side edge 168, and a second side edge 170. Each of first side edge 168 and second side edge 170 extends from top edge 164 to bottom edge 166 opposite one another.

Third cladding sheet 76C defines a front or upstream surface 180, a rear or downstream surface 182 opposite to and facing in an opposite direction than upstream surface 160, top edge 184, bottom edge 186 opposite top edge 184, a first side edge 188, and a second side edge 190, according to one embodiment. Each of first side edge 188 and second side edge 190 extends from top edge 184 to bottom edge 186 opposite one another. While described primarily as being three cladding sheets 66, one, two, or more than three such cladding sheets 66 may be used to fit frame 54, as will be apparent to those of skill in the art.

Figure 12:
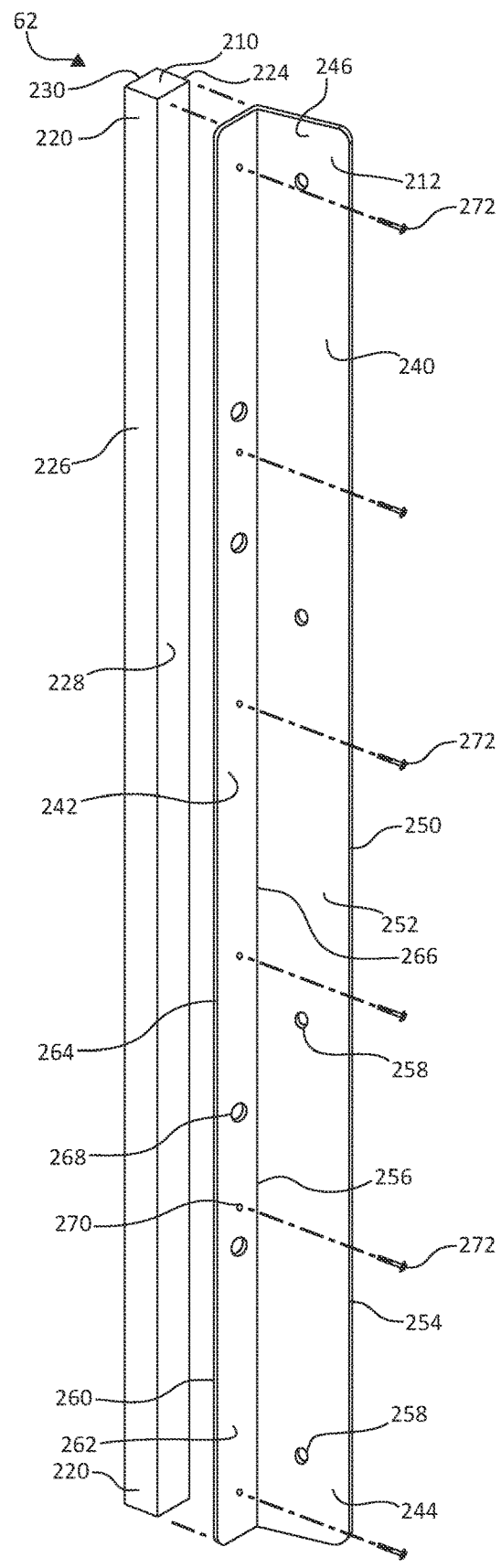
FIG. 12 is a perspective view of mounting bracket for coupling the skimmer of FIG. 8 with a sumped manhole, according to on embodiment of the present invention.

FIG. 12 illustrates one embodiment of fastening strip 78 formed as a substantially planar member extending between a first end 130 and a second end 132, for example, formed of rigid metal, such as aluminum of steel. In this manner, fastening strip 78 defines a front surface 200 and a rear surface 136 opposite front surface 200, both being substantially planar. A linear array of apertures 208, for example, substantially equally spaced along a length of fastening strip 78 is formed through a thickness of fastening strip 78, that is, from front surface 200 to and through rear surface 206.

Figure 13:
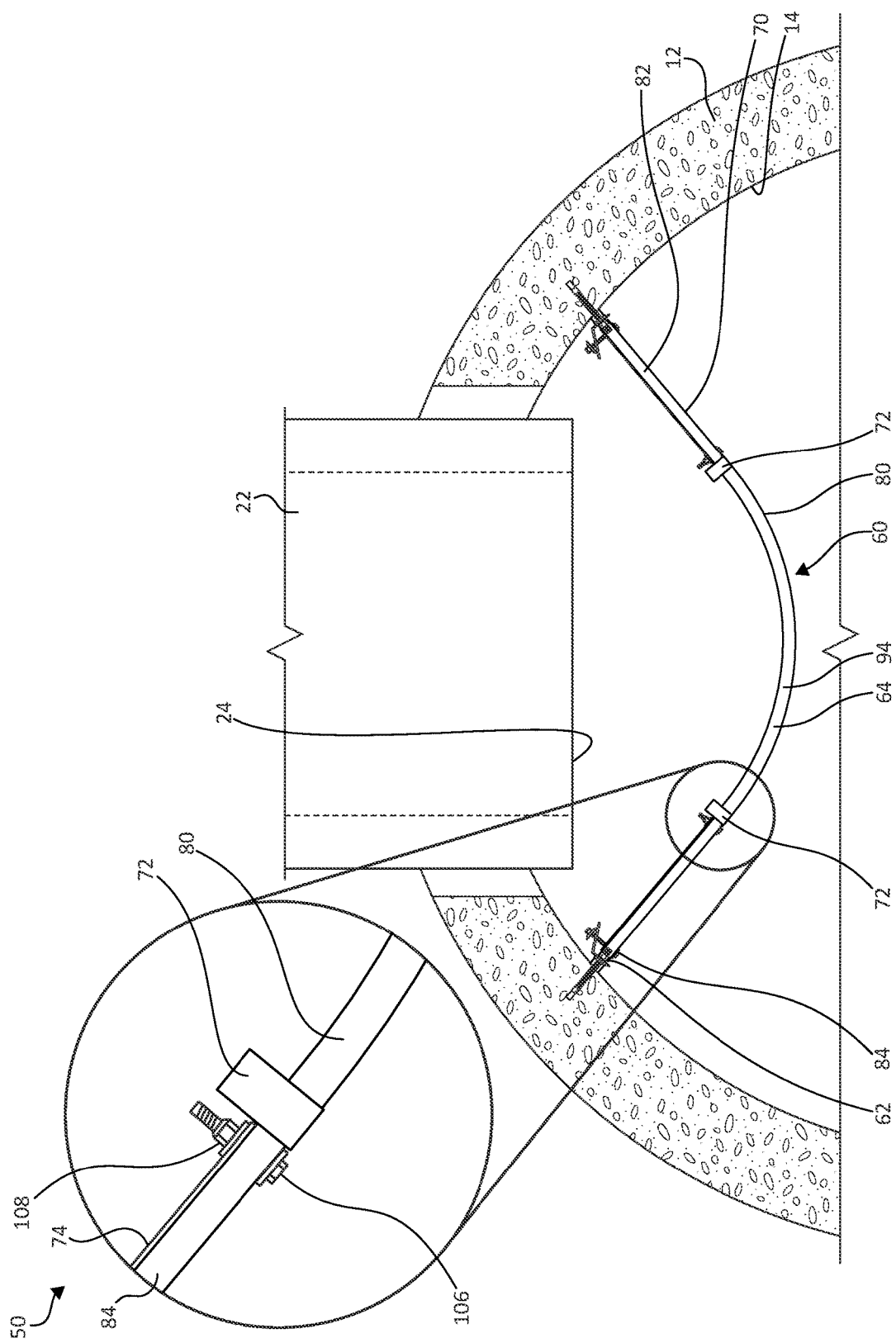
FIG. 13 is an enlarged top view of a portion of the drain system of FIG. 6 with additional inset installation detail, according to one embodiment of the present invention.
Figure 14:
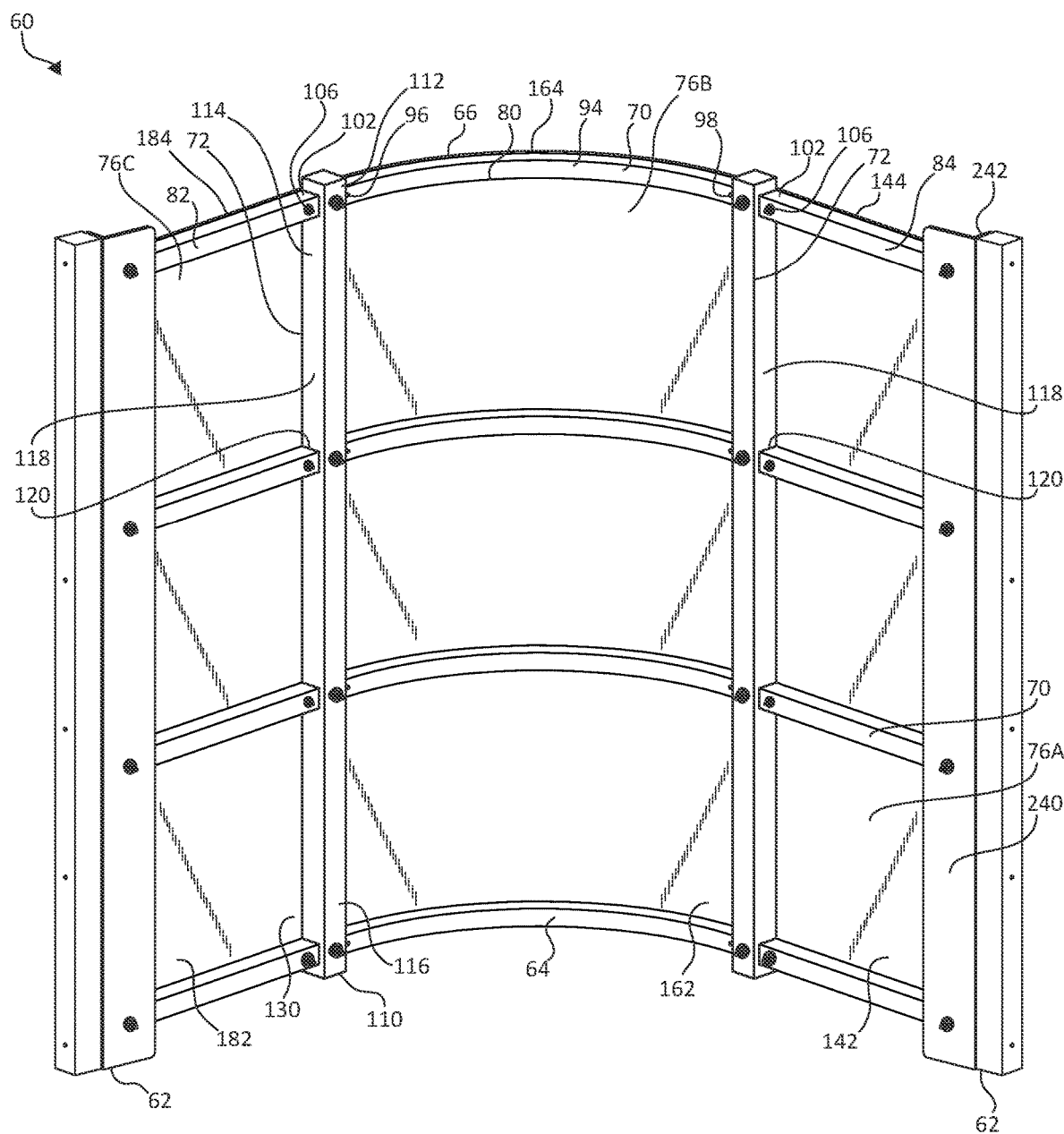
FIG. 14 is a perspective view illustration of a back side of a skimmer, according to one embodiment of the present invention.
Figure 15:
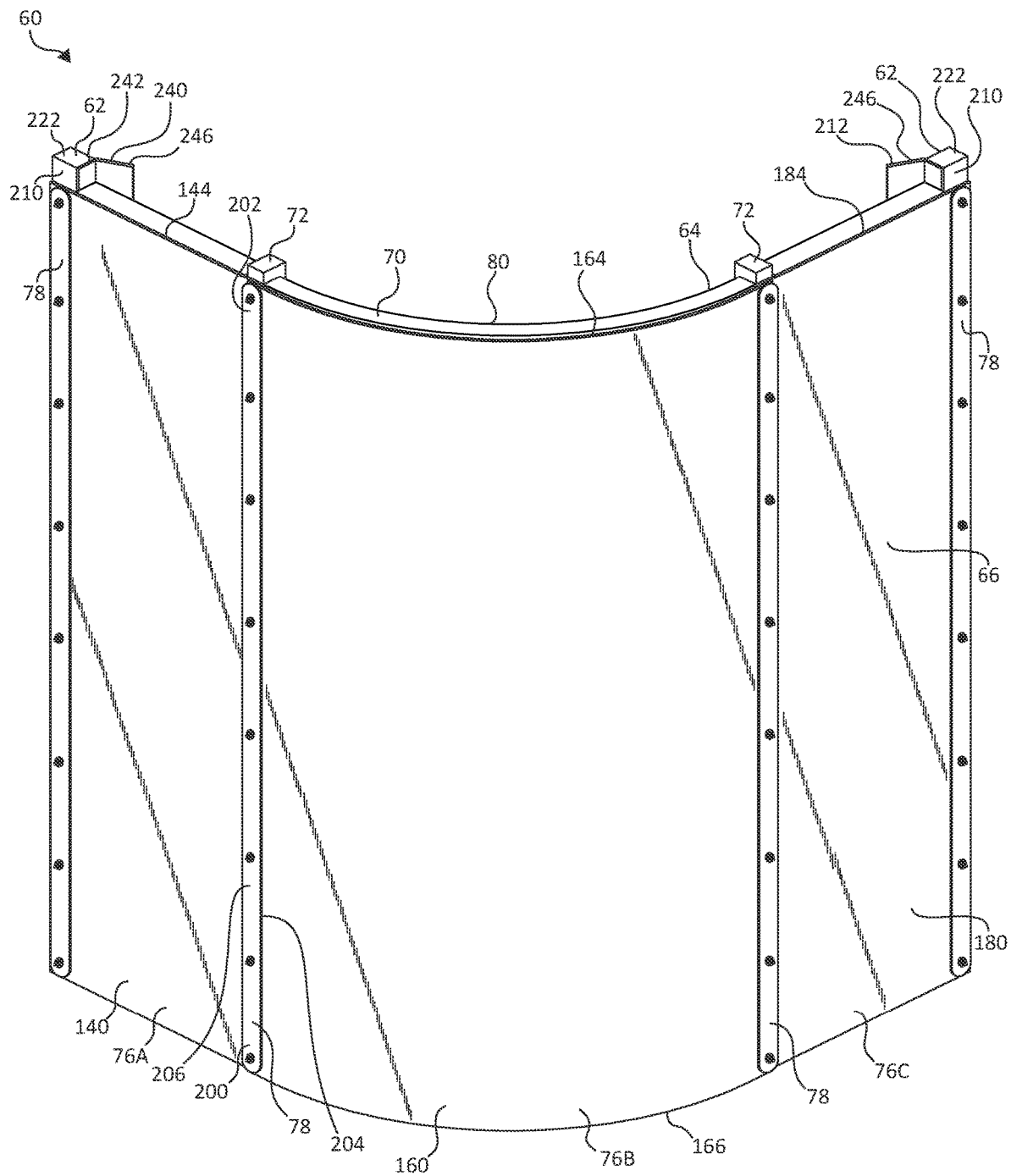
FIG. 15 is a perspective view illustration of a front side of the skimmer of FIG. 15, according to one embodiment of the present invention.
Figure 16:
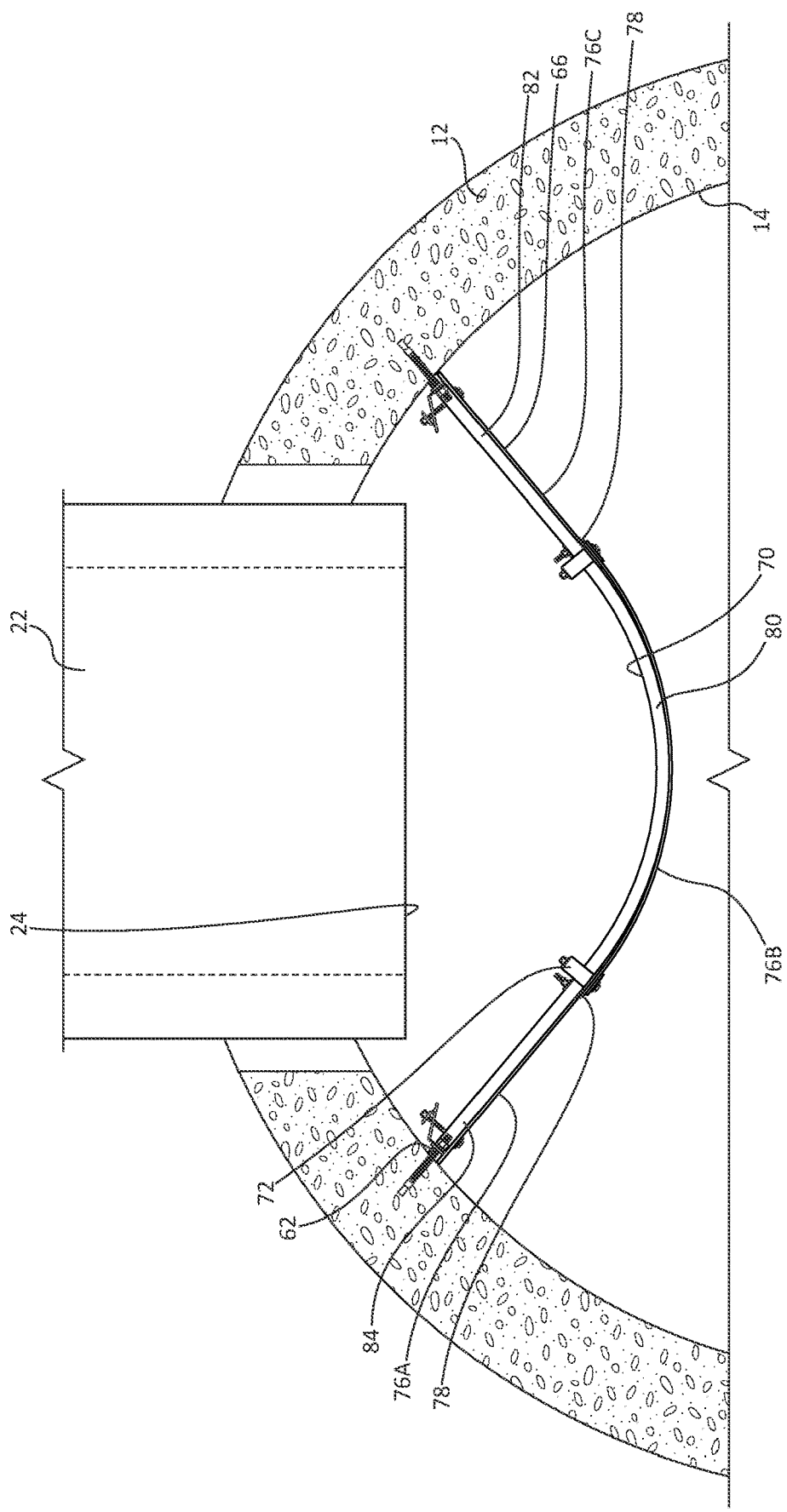
FIG. 16 is an enlarged top view of a portion of the drain system of FIG. 6 with additional inset installation detail, according to one embodiment of the present invention.

One embodiment of mounting bracket 62 is illustrated in FIG. 13 and includes a block 210 and an angle member 212. Block 210 is an elongated member with rectangular cross-section extending between a first end 220 and a second end 222. More specifically, block 210 defines a front surface 224, a rear surface 226 opposite and facing away from front surface 224, a first side surface 228 extending between front surface 224 and rear surface 226, and a second side surface 230 extending between front surface 224 and rear surface 226 opposite first side surface. Block 210 is formed of a liquid impervious but slightly compressible material, such as a foam resin or plastic, e.g., polyvinyl chloride (PVC), rubber, or similar, to assist in forming a tight seal between manhole 12 and skimmer 60, as will be further described below.

Angle 212 is formed of rigid metal, such as aluminum of steel, and defines a first planar segment 240 and a second planar segment 242 each extending between a first end 244 and an opposite or second end 246 of angle 212 and is configured to facilitate coupling frame 64 to manhole 12 (see FIG. 5). First planar segment 240 defines a front surface 250, a rear surface 252 opposite to and facing away from front surface 250 extending between a free longitudinal edge 254 and a longitudinal intersecting edge 256, which abuts second planar segment 242, according to one embodiment. A plurality of apertures 258 are formed at various longitudinal distances along and through first planar segment 240 for facilitating coupling to a frame 64.

In one embodiment, second planar segment 242 defines a front surface 260, a rear surface 262 opposite to and facing away from front surface 260 extending between a free longitudinal edge 264 and a longitudinal intersecting edge 266, which abuts first planar segment 240. A plurality of holes 268 are formed at various longitudinal distances along and through second planar segment 242 for facilitating coupling to a manhole 12. In one example, each of the plurality of holes 268 are elongated to allow for adjustment in coupling frame 64 to mounting bracket 62 so frame 64 is properly fit within manhole (see, e.g., FIG. 5). Similarly, in one embodiment, a plurality of coupling apertures 270 are formed at various longitudinal distances along and through second planar segment 242 for facilitating coupling to a manhole 12.

In one embodiment, second planar segment 242 is placed adjacent to and in a manner abutting front surface 260 against first side surface 228 of mounting block 210, and is secured thereto via small screws 272 or other securement mechanisms extending through small apertures 270 or in another suitable manner. As such, mounting bracket 62 is assembled and ready for use with frame 64 to secure frame 64 and cladding sheet 66, via frame 64, to manhole 12 (see, e.g., FIG. 5).

To install skimmer 60 for use, the various members of skimmer 60, that is adjustable arcs 70, vertical supports 72, cladding sheets 66, and fastening strips 78 are transported to the field to secure the same in a manhole of other flow-through structure, such as manhole 12 (see FIGS. 5-7, 14, and 17). In one embodiment, even though skimmer 60 has adjustability to fit different sizes of manholes, a general size of skimmer 60, particularly adjustable arcs 70, is selected for the size of manhole 12, which falls in a range of manhole sizes that skimmer 60 is formed to fit. Once at manhole 12, outlet pipe 22 is identified as the pipe where flow is exiting manhole 12 as skimmer 60 will be installed to curve about outlet pipe 22 opening.

Adjustable arc 70 is brought into manhole 12 and is test fitted to manhole to arc about and convex to outlet pipe 22. More specifically, in one embodiment, adjustable arc 70 is held in a substantially horizontal manner about a center of outlet pipe 20, that is, so a center axis of outlet pipe aligns with a center of curvature of arced member 80 of adjustable arc 70. When so holding adjustable arc 70 in place, pin members 106 are loosened and first end 90 of arced member 80 is moved into and out of second end 102 of first linear member 82 and/or second end 92 of arced member 80 is moved into and out of second end 102 of second linear members 84 to adjust the overall size of adjustable arc 70 to fit manhole 12. Determining an appropriate size of adjustable arc 70 is based on the diameter of manhole 12 and a desire to avoid adjustable arc 70 and/or associated mounting bracket 62 hitting obstructions in manhole 12 that may make coupling of skimmer 60 to manhole 12 more difficult. Once adjustable arc 70 is so sized, pin 106 is reinserted through the at least one aperture pair 104 and an appropriate one of array of apertures 96 to maintain a desired size of adjustable arc 70.

Positions on manhole 12 where each first end 100 of first linear member 82 and of second linear member 84 hit the curved, cylindrical sidewall 14 of manhole 12 contact each other with a marking utensil of some sort. Next, the vertical center of outlet pipe 22 is determined. Using a level, a horizontal line is marked to extend radially, along the curvature of manhole 12, and outwardly from the vertical center of inlet pipe 18 to cross a point where one or more of first ends 100 of first linear members 82 of adjustable arcs 70 were marked. One of mounting brackets 62 is positioned within manhole 12 using the above-described marks as guides and a level to position mounting bracket 62 in a substantially vertical position. More specifically, mounting bracket 62 is positioned so its vertical or longitudinal center vertically aligns with the center of outlet pipe 22 and an edge lies along the marks with second side surface 230 (see FIG. 13) abutting sidewall 14 of manhole 12.

Mounting bracket 62 is secured in place via anchors, bolts, screws, and/or other coupling mechanism 300 each extending through one of the plurality of holes 268 and mounting block 210 and into sidewall 14 as shown with additional reference to FIGS. 14-17. In one example, each of the plurality of elongated holes 268 allow the position of each coupling mechanism 300 to be adjusted slightly to avoid obstructions, if any, in sidewall 14 while maintaining a desired location of mounting bracket 62. A similar process is repeated for another mounting bracket 62 on an opposite side of outlet pipe 22.

Once the two mounting brackets 62 are in place, an adjustable arc 70, which was already adjust to a desired size during test fitting, is positioned to extend therebetween and to be coupled to each mounting bracket 62 via an opposing one of first ends 100. More specifically, a bolt or coupling mechanism 301 is thread through an aperture in first end 100 of first linear member 80 and through one of the plurality of apertures 258 in first planar segment 240 and caps with a nut to secure adjustable arc 70 to one of mounting brackets 62. Then, in one example, another bolt or coupling mechanism 301 is thread through an aperture in first end 100 aperture of second linear member 82 and through one of the plurality of apertures 258 in first planar segment 240 of the other mounting bracket 62 to be capped with a nut to secure adjustable arc 70 to the other mounting brackets 62. Each of the other plurality of adjustable arcs 70 are similarly attached to extend between a different two ones of apertures 258.

Vertical supports 72 are coupled to and extend between each of adjustable arcs 70. More specifically, one of vertical supports 72 is placed so each notch 120 receives a different arced member 80 near or directly adjacent to first linear member 82 where notch 120 is formed to have a cross-sectional shape matching that of arced member 80. Another vertical support 72 is placed so each notch 120 thereof receives a different arced member 80 near or directly adjacent to second linear member 84. Once so positioned, each vertical support 72 is coupled to each adjustable arc 80 with a coupling mechanism 302. In one example, this assembly substantially completes formation of frame 64, while in other embodiments, additional components of frame 64 may be included.

Once frame 64 is completed, cladding 66 is added thereto. In one embodiment, side cladding sheets 76A and 76B are coupled to frame 64 near sidewall 14 of manhole 12 via suitable fastening elements 304, such as screws, extending through each cladding sheet 76A or 76B and into mounting block 210 of an adjacent mounting bracket 62. Each cladding sheet 76A covers a substantial entirety of a height of frame 64 on either portion of frame 64 outside each vertical support 72. In one example, fastening elements 304 are attached to cladding sheets 76A and 76B through apertures 208 in fastening strips 78 for a more secure and robust coupling.

In one embodiment, cladding sheet 76B is paced at a center of frame 64 to cover a substantial entirety of a height of a center of frame 64 extending between the two vertical supports 82. In one example, first side edge 168 of cladding sheet 76B overlaps second side edge 150 of cladding sheet 76A where both extend over vertical support 72. A fastening strip 78 is placed opposite that vertical support 72 and fastening elements 304 are inserted through apertures 208 in fastening strip 78, through cladding sheet 76B, through cladding sheet 76A and into vertical support 72 to tightly secure each cladding sheet 76A and 76B to frame 64.

When cladding sheet 76B is so paced at a center of frame 64, second side edge 170 of cladding sheet 76B overlaps first side edge 188 of cladding sheet 76C where both extend over the other one of vertical supports 72. Another fastening strip 78 is placed opposite that vertical support 72 and fastening elements 304 are inserted through apertures 208 in fastening strip 78, through cladding sheet 76B, through cladding sheet 76C and into vertical support 72 to tightly secure each cladding sheet 76B and 76C to frame 64. As a result, when cladding sheets 76A, 76B, and 76C are so installed, they cover all area between mounting brackets 62 across a substantial entirety of frame 64 in a manner generally prevent water flow therethrough.

In view of the above, skimmers 60 according to the present invention are configured for adjustability in the field allowing one size of skimmer 60 to be used with multiple sizes of manhole 12 and/or to adjust to size variations or obstructions that one may encounter with sidewall 14 of manhole 12. In one example, the adjustability allows for a superior fit of skimmer 60 in manhole 12 as compared with prior art skimmers. In addition, this adjustability not only saves time during installation as problem shooting solutions are built into frame 64, but also saves on the inventory of differently sized skimmers needed.

In one embodiment, skimmer 60 is used alone in sumped manhole as illustrated in FIGS. 5-7. In other embodiments, skimmer 60 is used with other assemblies, accessories, etc. to facilitate continued flow through and/or filtering of the flow through sumped manhole 12. For example, skimmer 60 may be used with a dissipator such as that described in U.S. Pat. No. 9,752,600, entitled U.S. Pat. No. 9,752,600, filed on May 29, 2015, and issued on Sep. 5, 2017, or any other suitable dissipator or manhole accessory or enhancement.

Figure 17:
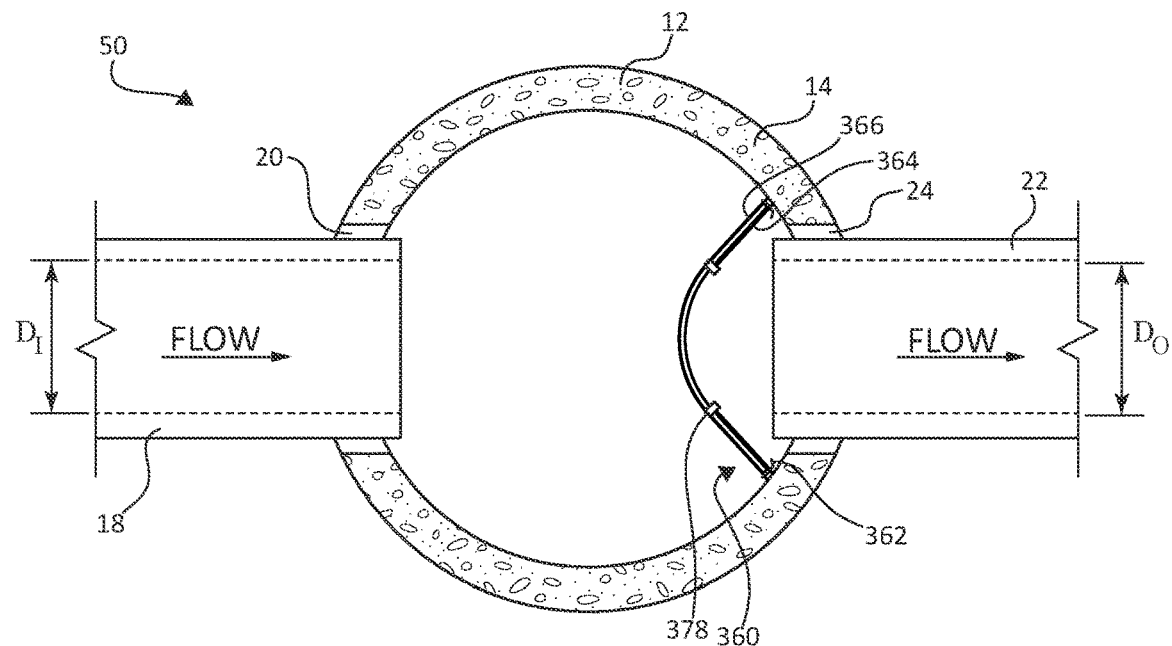
FIG. 17 is an inside, top view of a drain system, according to one embodiment of the present invention.
Figure 18:
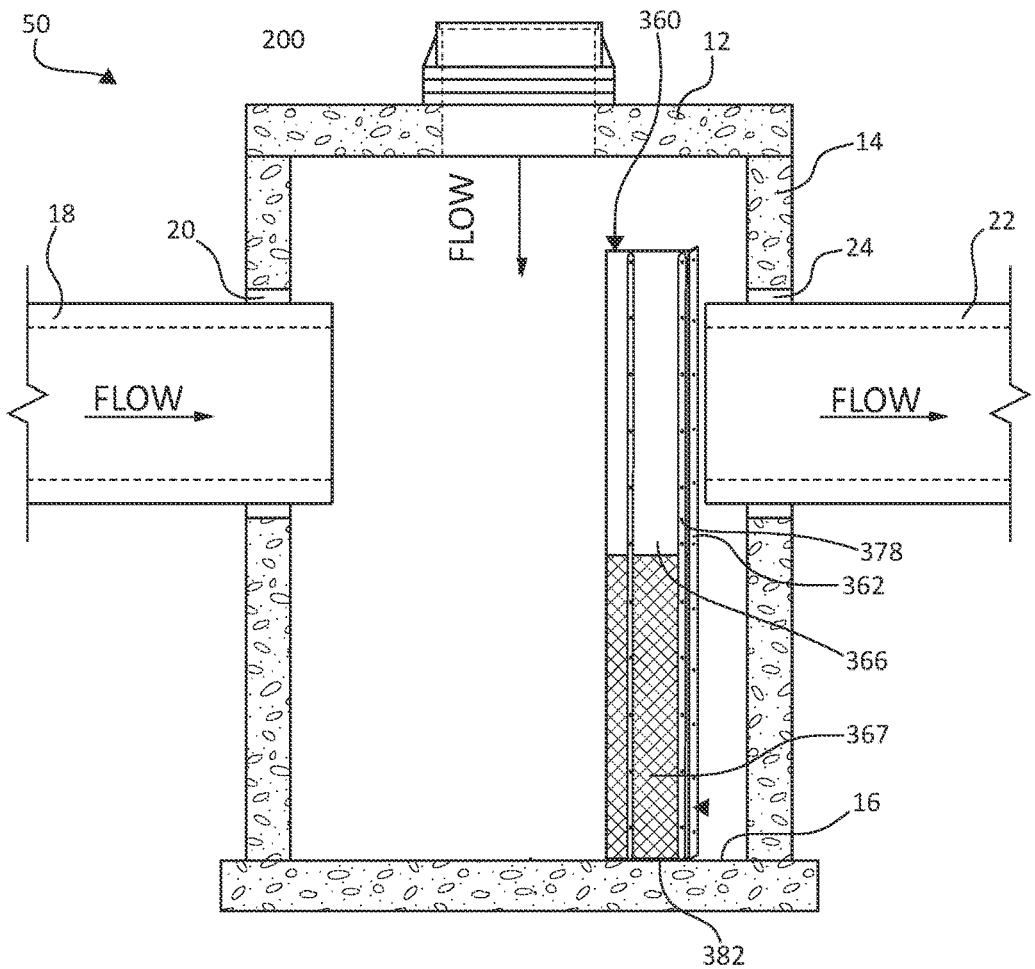
FIG. 18 is a right view of the drain system of FIG. 17 with a portion of the sumped manhole removed for illustrated purposes, according to one embodiment of the present invention.

In other embodiments, design of the skimmer 60 is adjusted based on a desired use and/or location in which the skimmer is used. For instance, FIGS. 17 and 18 illustrated another example of a skimmer 360, according to one embodiment of the present invention. FIGS. 17 and 18, illustrate a skimmer 360, according to one embodiment of the invention, including a frame 364 and cladding sheets 366 coupled thereto. Frame 364 is formed similar to frame 64 and is similarly adjustable. In one embodiment, frame 364 is longer extending entirely to the inside bottom surface of the sumped manhole 12 and configured to be coupled thereto via mounting bracket 362, which, in one example, are similar to, but longer than mounting brackets 62 described above.

When frame 364 is coupled to sumped manhole 12 with mounting brackets 362 on either side thereof, at least one top cladding sheet 366, which is, in one example, similar to cladding sheets 66 as described above, and at least one bottom cladding sheet 367 are coupled to frame 364 using fastener strips 378. In one example, at least one top cladding sheet 366 covers upstream side of between about 25% and about 75%, such as about 50%, of a height of frame 364 and the at least one bottom cladding sheets 367 covers the upstream side of between about a 25% and about 75%, such as about 50%, of a height of the frame 364 below the at least one top cladding sheet 366. In this manner, skimmer 360 is provided with top and bottom sections, with the at least one top cladding sheet 366 of the top section allowing no fluid flow therethrough, and the at least one bottom cladding sheet 367 of the bottom section allowing only fluid and not larger debris or sediment to pass therethrough to reach outlet pip 22. In one example, a flexible sealant 382 is added at the bottom of the at least one bottom cladding sheet 367 and/or a bottommost surface of frame 364 to further secure skimmer 360 to a bottom of sumped manhole 12.

Figure 19:
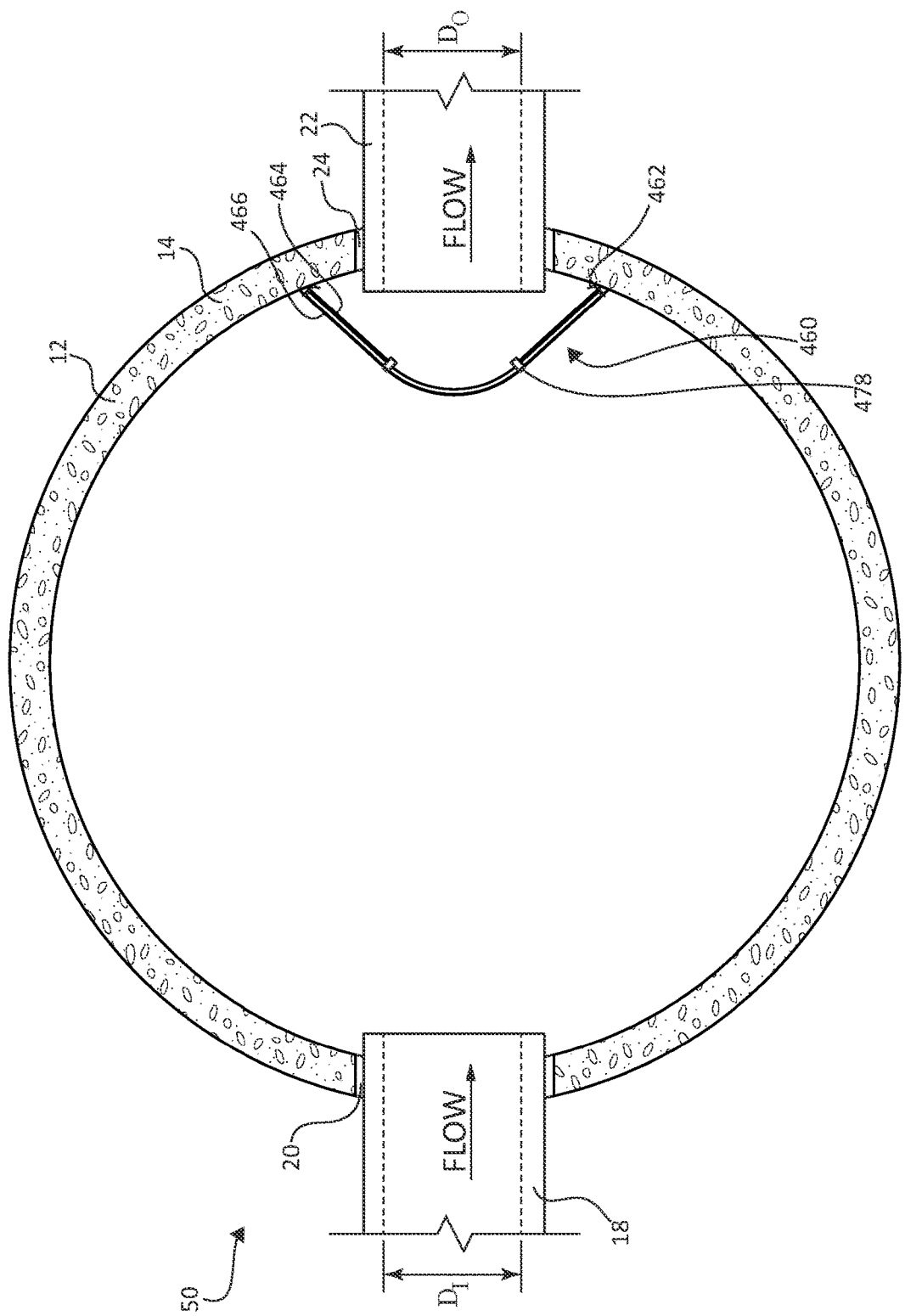
FIG. 19 is an inside, top view of a drain system, according to one embodiment of the present invention.
Figure 20:
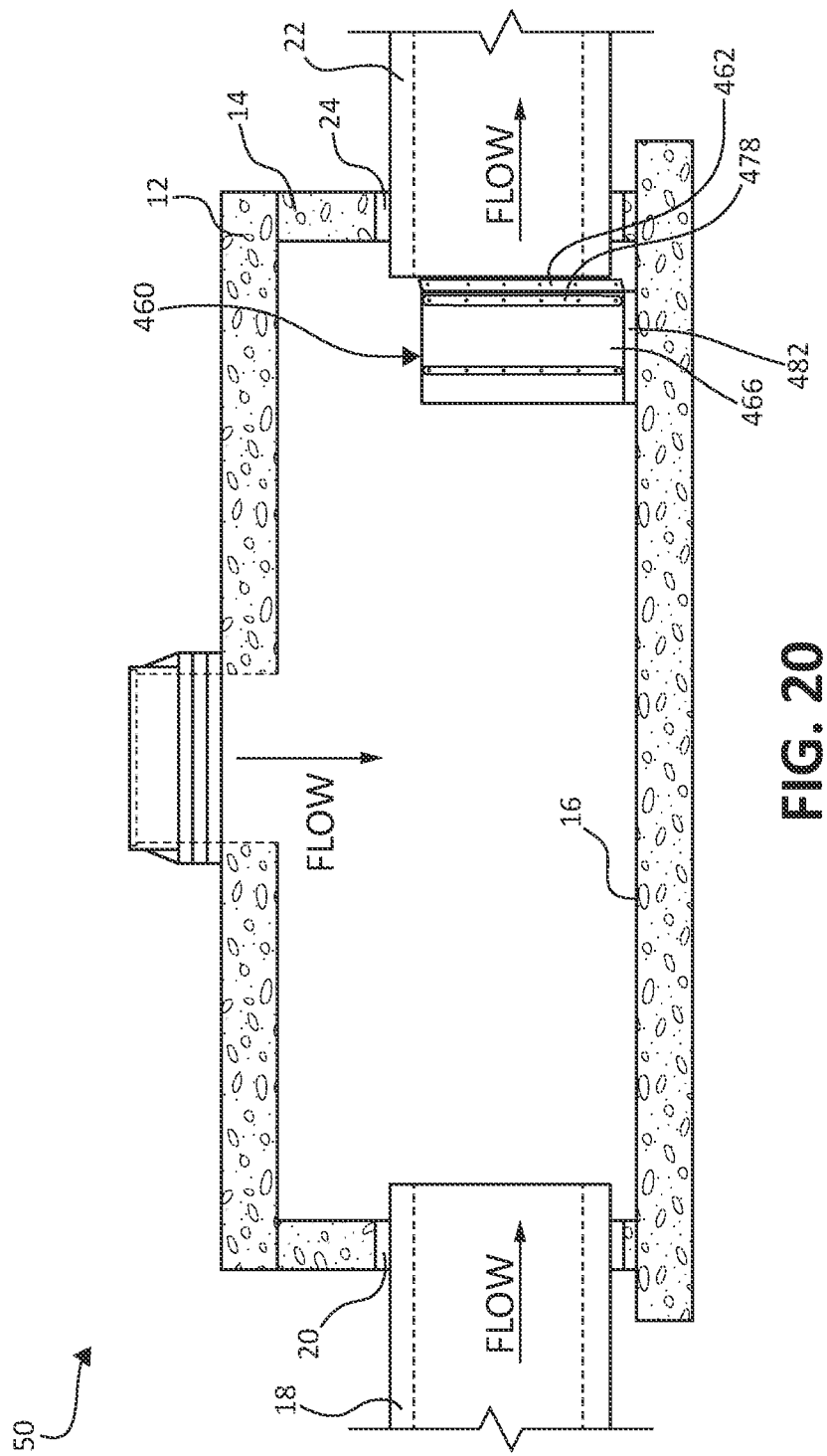
FIG. 20 is a right view of the drain system of FIG. 19 with a portion of the sumped manhole removed for illustrated purposes, according to one embodiment of the present invention.

In one embodiments, such as that illustrated in FIGS. 19 and 20, a skimmer 460 is provided and installed in sumped manhole 12 to function as a weir, that is to raise the water level in sumped manhole 12 and/or divert flow of the water out sumped manhole 12. According to one embodiment of the invention, skimmer 460 includes a frame 464 and cladding sheets 466 coupled thereto. Frame 464 is formed similar to frame 64 and is similarly adjustable. In one embodiment, frame 464 is configured to be to sumped manhole 12 via mounting brackets 462, which, in one example, are similar to mounting brackets 62 described above.

When frame 464 is coupled to sumped manhole 12 with mounting brackets 462 on either side thereof, at least one cladding sheet 466, which is, in one example, similar to cladding sheets 66 as described above, is coupled to frame 464 using fastener strips 478, which are similar to fastener strips 78 described above. In one example, the at least one cladding sheet 466 and/or frame 464 extends to the bottom interior wall of sumped manhole 12. Bottoms of the at least one cladding sheets 466 and/or frame 464 are secured to a bottom of sumped manhole 12 using suitable mud 482, such as a non-shrink grout, to further secure skimmer 360 to a bottom of sumped manhole 12 in a manner generally preventing fluid flow beneath skimmer 460. Although the invention has been described with respect to particular embodiments, such embodiments are meant for the purposes of illustrating examples only and should not be considered to limit the invention or the application and uses of the invention. Various alternatives, modifications, and changes will be apparent to those of ordinary skill in the art upon reading this application. Furthermore, there is no intention to be bound by any theory presented in the preceding background of the invention or the above detailed description.

What is claimed is:
1. A skimmer for use in a manhole comprising:
    a frame defining an upstream side and a downstream side, the frame including:
    an adjustable arc having an adjustable overall length and including:
    an arced member having a first end and a second end opposite the first end and defining a curve between the first end and the second end,
    a first side member slidably adjustable relative to a first end of the arced member and selectively coupled with a first end of the arced member in one of a plurality of predefined first side member positions, and
    a second side member slidably adjustable relative to a second end of the arced member and selectively cou- plable with the second end of the arced member in one of a plurality of predefined second side member positions, and liquid impervious cladding covering a substantial entirety of an upstream side of the frame and configured to force fluid flow within the manhole to exit the skimmer from below the skimmer.

2. The skimmer of claim 1, wherein the overall length of the adjustable arc is adjustable by selectively coupling the first member to the arced member at different ones of the plurality of predefined second side member positions selectively coupling the second side member to the arced member.

3. The skimmer of claim 2, wherein one of the first side member and the arced member is telescopically received within the other one of the first side member and the arced member.

4. The skimmer of claim 3, wherein:
the first plurality of predefined first side member positions each correspond to a different distance,
one of the first side member and the arced member extends into the other one of the first side member and the arced member,
the one of the first side member and the arced member includes a plurality of apertures longitudinally spaced along the one of the first side member and the arced member,
the other of the one of the first side member and the arced member includes at least one aperture, and
the frame includes a pin extending through the at least one aperture and one of the plurality of apertures to couple the first side member to the arced member in one of the plurality of predefined positions.

5. The skimmer of claim 1, wherein the first side member is substantially linear, and the second side member is substantially linear.

6. The skimmer of claim 1, further comprising:
plurality of additional adjustable arcs, each having an arced member, a first side member and a second side member as recited in claim 1, vertically spaced from one another, and
wherein the frame further includes a vertical support member coupled to each of the plurality of adjustable arcs.

7. The skimmer of claim 6, wherein:
the vertical support member includes a plurality of notches longitudinally spaced from each other along a length of the vertical support member, and
each notch has a cross-sectional shape configured to receive a portion of one of the first side member and the second side member of each of the adjustable arcs.

8. The skimmer of claim 6, wherein the cladding is coupled to the frame via fastening members extending through the cladding and into the vertical support member.

9. The skimmer of claim 8, wherein the cladding includes a plurality of cladding sheets each overlapping at least one other of the plurality of sheets and each extending over the vertical support member.

10. The skimmer of claim 1, wherein the cladding is formed from liquid impervious sheeting such that the cladding is configured to force fluid flow within the manhole to be diverted around the cladding.

11. The skimmer of claim 8, wherein:
the cladding includes at least one top cladding sheet covering a top portion of the frame and at least one bottom cladding sheet covering the bottom portion of the frame, and the at least one top cladding sheet and the at least one bottom cladding sheet are each formed from a liquid impervious sheeting.

12. The skimmer of claim 1, wherein the first side member extends at an angle relative to the second side member of at least about 80 degrees and less than about 100 degrees.

13. The skimmer of claim 1, further comprising:
a first mounting bracket coupled to the first side member and configured to be coupled to an inside sidewall of the manhole.

14. The skimmer of claim 1, wherein the adjustable arc has an adjustable overall depth measured from an upstream edge of the adjustable arc to a downstream edge of the adjustable arc, the adjustable overall depth and the adjustable overall length changing depending upon the one of the plurality of predefined first side member positions and the one of the plurality of predefined second side member positions being selectively coupled with the first end and the second end of the arced member, respectively, to accommodate a distance an outlet pipe extends into the manhole.

15. A drain system comprising:
a manhole having a sidewall and a bottom wall surrounded by the sidewall;
an outlet pipe extending into the manhole through the sidewall; and
a skimmer coupled to the sidewall of the manhole on each of opposing sides of the outlet pipe, the skimmer comprising:
a frame defining an upstream side and a downstream side, the frame including:
an adjustable arc having an adjustable overall length and including:
an arced member having a first end and a second end opposite the first end and defining a curve between the first end and the second end,
a first side member slidably adjustable relative to a first end of the arced member and selectively coupled with a first end of the arced member in one of a plurality of predefined first side member positions, and
a second side member slidably adjustable relative to a second end of the arced member and selectively couplable with the second end of the arced member in one of a plurality of predefined second side member positions, and
cladding covering a substantially entirety of an upstream side of the frame and configured to at least partially interrupt fluid flow to the outlet pipe;
wherein the frame is mounted at a position spaced above the bottom wall of the manhole and the cladding includes a bottommost edge spaced above the bottom wall to allow fluid flow below the skimmer between the skimmer and the bottom wall of the manhole.

16. The drain system of claim 15, wherein the overall length of the adjustable arc is adjustable by selectively coupling the first member to the arced member at different ones of the plurality of predefined second side member positions selectively coupling the second side member to the arced member.

17. The drain system of claim 16, wherein one of the first side member and the arced member is telescopically received within the other one of the first side member and the arced member.

18. The drain system of claim 15, further comprising a plurality of additional adjustable arcs vertically spaced from one another, each having an arced member, a first side member and a second side member as recited in claim 16, and wherein the frame further includes a vertical support member coupled to each of the plurality of adjustable arcs.

19. The drain system of claim 15, wherein:
the cladding is coupled to the frame via fastening members, and
the cladding is formed from liquid impervious sheeting.

20. The drain system of claim 15, wherein:
the skimmer includes a bottom edge spaced entirely from the bottom wall of the manhole in a manner configured to allow fluid within the manhole to flow below the skimmer between the skimmer and the bottom wall of the manhole; and
the manhole includes a sump below the outlet pipe and above the bottom wall of the manhole.

\* \* \* \* \*